(12) United States Patent
Mishima (10) Patent No.: US 11,142,026 B2
(45) Date of Patent: Oct. 12, 2021

(54) TYRE

(71) Applicant: Sumitomo Rubber Industries, Ltd., Hyogo (JP)

(72) Inventor: Mari Mishima, Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 200 days.

(21) Appl. No.: 16/297,761

(22) Filed: Mar. 11, 2019

(65) Prior Publication Data

US 2019/0308465 A1    Oct. 10, 2019

(30) Foreign Application Priority Data

Apr. 6, 2018 (JP) .............................. JP2018-074060

(51) Int. Cl.
*B60C 11/12* (2006.01)
*B60C 11/03* (2006.01)

(52) U.S. Cl.
CPC ...... *B60C 11/1204* (2013.01); *B60C 11/0306* (2013.01); *B60C 11/1236* (2013.01); *B60C 11/1263* (2013.01); *B60C 2011/0372* (2013.01); *B60C 2011/0388* (2013.01); *B60C 2011/1209* (2013.01); *B60C 2011/1213* (2013.01); *B60C 2011/1227* (2013.01); *B60C 2011/1268* (2013.01)

(58) Field of Classification Search
CPC ............. B60C 11/1204; B60C 11/1236; B60C 11/1263; B60C 2011/0372; B60C 2011/1213; B60C 2011/1227
See application file for complete search history.

(56) References Cited

U.S. PATENT DOCUMENTS 5,109,904 A    5/1992  Numata et al.
D360,859 S *  8/1995  Attinello ...................... D12/601
(Continued)

FOREIGN PATENT DOCUMENTS

EP    2639084 A1    9/2013
EP    3269565 A1    1/2018
(Continued)

OTHER PUBLICATIONS

Ohashi, JP-2002046426-A Machine Translation (Year: 2002).*
(Continued)

*Primary Examiner* — Katelyn W Smith
*Assistant Examiner* — Jack Edmondson Odom
(74) *Attorney, Agent, or Firm* — Studebaker & Brackett PC (57) ABSTRACT

A tyre has a tread portion. The tread portion has a land region divided by a first edge and a second edge extending in a tyre circumferential direction. The land region is provided with a plurality of sipes each extending between the first edge and the second edge. The plurality of the sipes includes inclined sipes and bent sipes. Each of the bent sipes includes first inclined elements inclined in the first direction with respect to the tyre axial direction and a second inclined element inclined in a direction opposite to the first inclined elements with respect to the tyre axial direction. Each of the inclined sipes is configured to have a depth larger at a center portion thereof than at both end portions thereof. Each of the bent sipes is configured to have a depth smaller at a center portion thereof than at both end portions thereof.

18 Claims, 6 Drawing Sheets

(56) References Cited

U.S. PATENT DOCUMENTS

| | | | | |
|---|---|---|---|---|
| 2009/0283188 A1* | 11/2009 | Itoh | ............... | B60C 11/0309 |
| | | | | 152/209.18 |
| 2012/0175031 A1* | 7/2012 | Mori | ............... | B60C 11/1272 |
| | | | | 152/209.8 |
| 2014/0238568 A1* | 8/2014 | Haga | ............... | B60C 11/0306 |
| | | | | 152/209.18 |
| 2014/0345767 A1* | 11/2014 | Tanaka | ............... | B60C 11/1204 |
| | | | | 152/209.22 |
| 2015/0136288 A1* | 5/2015 | Nemoto | ............... | B60C 11/1236 |
| | | | | 152/209.18 |
| 2016/0303919 A1* | 10/2016 | Yamaoka | ............... | B60C 11/1307 |
| 2017/0015144 A1* | 1/2017 | Ogihara | ............... | B60C 11/1307 |
| 2018/0015789 A1* | 1/2018 | Horiguchi | ............... | B60C 11/1218 |

FOREIGN PATENT DOCUMENTS

| | | | |
|---|---|---|---|
| JP | S61159203 U | | 10/1986 |
| JP | 2002046426 A | * | 2/2002 |
| JP | 2010126076 A | | 6/2010 |
| JP | 2010274846 A | | 12/2010 |
| JP | 2015009789 A | | 1/2015 |
| JP | 2016168991 A | | 9/2016 |
| JP | 2016-203703 A | | 12/2016 |

OTHER PUBLICATIONS

The extended European search report issued by the European Patent Office dated Jun. 17, 2019, which corresponds to European Patent Application No. 19161015.3-1012 and is related to U.S. Appl. No. 16/297,761.

* cited by examiner

TYRE

TECHNICAL FIELD

The present invention relates to a tyre capable of improving durability performance while exerting both steering stability performance on a dry road surface and on-ice/on-snow performance.

BACKGROUND ART conventionally, tyres having improved steering stability performance on an icy and snowy road surface (hereinafter referred to as "on-ice/on-snow performance") have been known. Japanese Unexamined Patent Application Publication No. 2016-203703 (Patent Literature 1) has disclosed a tyre having land regions defined between main grooves extending continuously in a tyre circumferential direction and having improved on-ice/on-snow performance by provision of a plurality of lateral grooves and a plurality of sipes extending from the main grooves to terminate within the land region, for example.

SUMMARY OF THE INVENTION

However, the tyre disclosed in the Patent Literature 1 is provided with the sipes connecting between the lateral grooves and the sipes crossing the land region, therefore, it is possible that rigidity of the land region is decreased, thereby, there has been room for improvement for the steering stability performance on a dry road surface. Further, each of the sipes crossing the land region provided in the tyre disclosed in the Patent Literature 1 has a constant depth, therefore, the land region is likely to be damaged when excessive load is applied to the land region, thereby, there has been room for improvement.

The present invention was made in view of the above, and a primary object thereof is to provide a tyre capable of improving the durability performance while exerting both of the steering stability performance on a dry road surface and the on-ice/on-snow performance.

In one aspect of the present invention, a tyre comprises a tread portion comprising a land region divided by a first edge extending in a tyre circumferential direction and a second edge extending in the tyre circumferential direction, wherein the land region is provided with a plurality of sipes each extending between the first edge and the second edge, the plurality of sipes includes inclined sipes and bent sipes, the inclined sipes are inclined in a first direction with respect to a tyre axial direction, each of the bent sipes includes first inclined elements inclined in the first direction with respect to the tyre axial direction and a second inclined element inclined in a direction opposite to the first inclined elements with respect to the tyre axial direction, each of the inclined sipes is configured to have a depth larger at a center portion thereof than at both end portions thereof, and each of the bent sipes is configured to have a depth smaller at a center portion thereof than at both end portions thereof.

In another aspect of the invention, it is preferred that the inclined sipes and the bent sipes are arranged alternately in the tyre circumferential direction.

In another aspect of the invention, it is preferred that each of the inclined sipes extends linearly.

In another aspect of the invention, it is preferred that each of the bent sipes is composed of the first inclined elements and the second inclined element configured to be linear.

In another aspect of the invention, it is preferred that in each of the bent sipes, the end portions are formed by the first inclined elements and the center portion is formed by the second inclined element.

In another aspect of the invention, it is preferred that the first inclined elements forming the end portions have an equal length to each other in the tyre axial direction.

In another aspect of the invention, it is preferred that a length in the tyre axial direction of the second inclined element is larger than a length in the tyre axial direction of each of the first inclined elements.

In another aspect of the invention, it is preferred that a length in the tyre axial direction of the second inclined element is in a range of from 110% to 135% of a length in the tyre axial direction of the center portion of each of the inclined sipes.

In another aspect of the invention, it is preferred that the inclined sipes and the first inclined elements extend in parallel to each other.

In another aspect of the invention, it is preferred that the land region is provided with first lateral grooves and second lateral grooves, each of the first lateral grooves extends from the first edge to terminate within the land region, each of the second lateral grooves extends from the second edge to terminate within the land region, and the first lateral grooves and the second lateral grooves are arranged alternately in the tyre circumferential direction.

In another aspect of the invention, it is preferred that in a combination of one first lateral groove, one second lateral groove, and one bent sipe adjacent to each other, at least one of the first lateral groove and the second lateral groove is arranged on an extended line of a corresponding one of the first inclined elements of the bent sipe.

In another aspect of the invention, it is preferred that a length in the tyre axial direction of each of the second lateral grooves is equal to a length in the tyre axial direction of each of the first lateral grooves.

In another aspect of the invention, it is preferred that the land region is arranged on a tyre equator.

DESCRIPTION OF THE PREFERRED EMBODIMENT

An embodiment of the present invention will now be described in conjunction with accompanying drawings.

Figure 1:
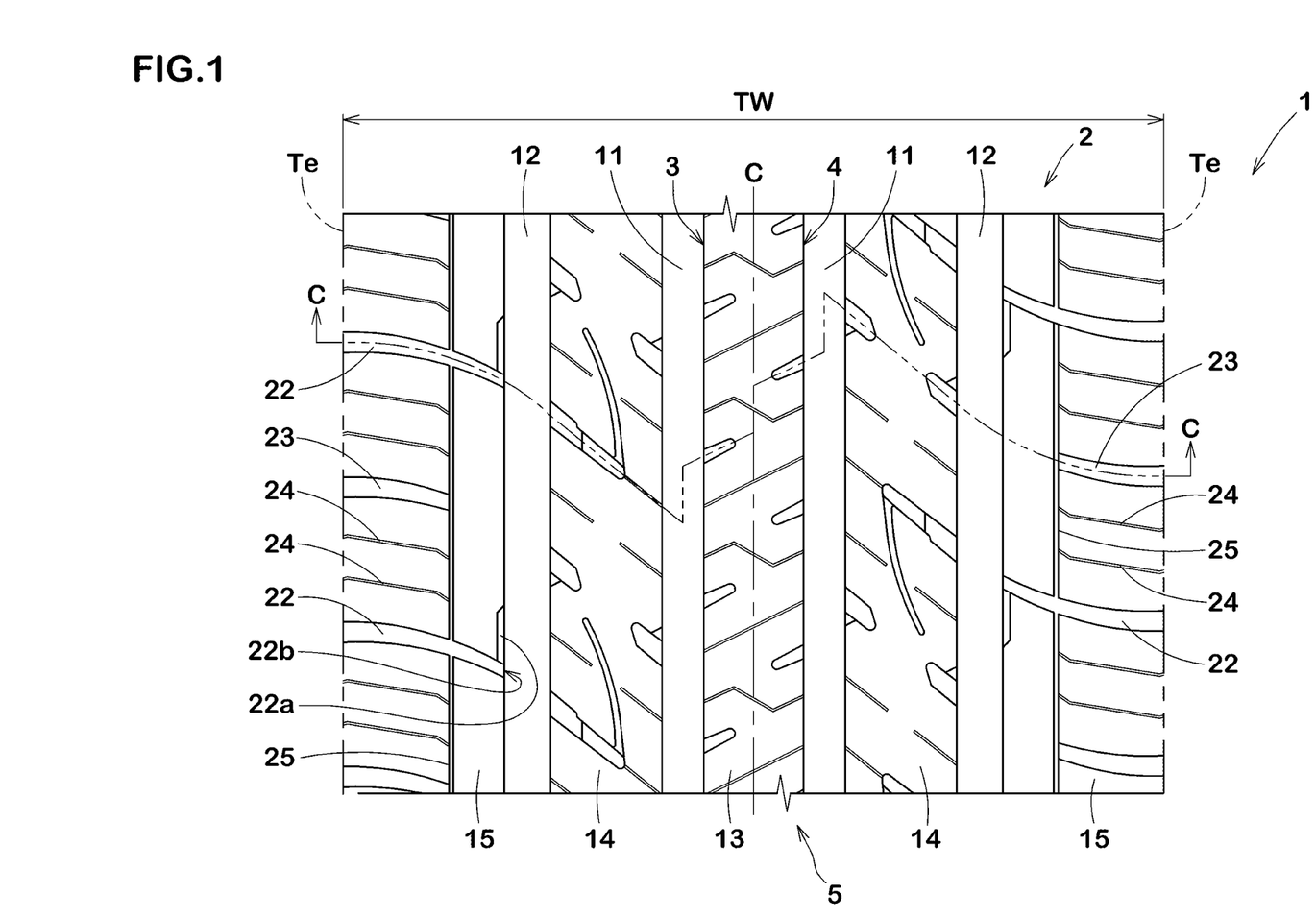
FIG. 1 is a development view of a tread portion of a tyre as an embodiment of the present invention.

FIG. 1 is a development view of a tread portion 2 of a tyre 1 according to an embodiment of the present invention. The tyre 1 in this embodiment can be used for various tyres such as a pneumatic tyre for a passenger car and for heavy load, and a non-pneumatic tyre not filled with pressurized air therein, for example. The tyre 1 in this embodiment is suitably used as a pneumatic tyre for a passenger car, for example.

As shown in FIG. 1, the tyre 1 in this embodiment has a tread portion 2 which is to be in contact with a road surface during running. It is preferred that the tread portion 2 has a land region 5 divided by a first edge 3 extending in the tyre circumferential direction and a second edge 4 extending in the tyre circumferential direction. Although not particularly limited, the land region 5 in this embodiment will be described below with a crown land region 13 as a representative example of the land region 5.

Figure 2:
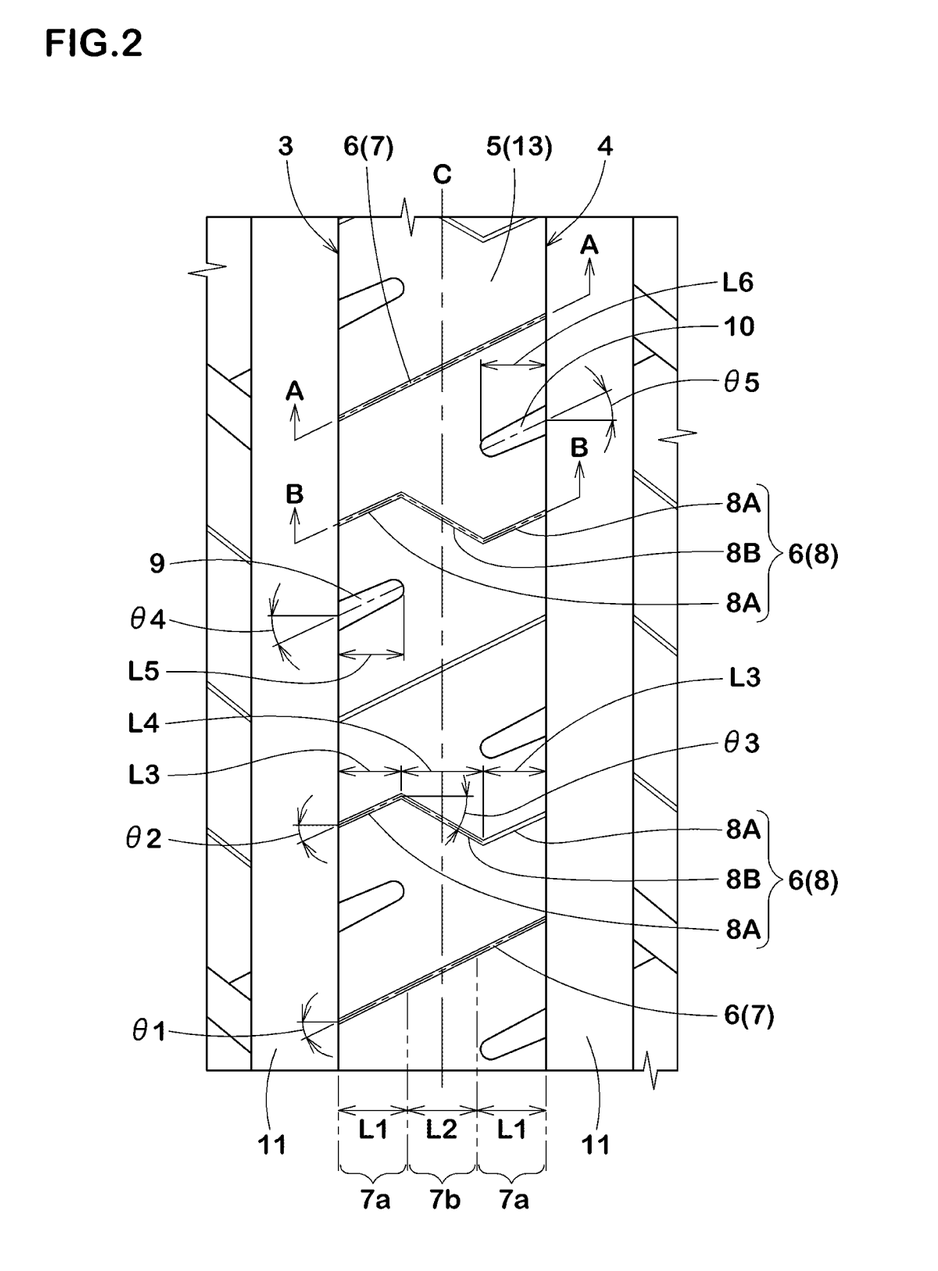
FIG. 2 is an enlarged view of a land region (crown land region).

FIG. 2 is an enlarged view of the land region 5. As shown in FIG. 2, it is preferred that the land region 5 is provided with a plurality of sipes 6 extending between the first edge 3 and the second edge 4. The land region 5 configured as such can ensure a large edge effect by the plurality of the sipes 6, therefore, it is possible that the on-ice/on-snow performance of the tyre 1 is improved.

The plurality of the sipes 6 in this embodiment includes inclined sipes 7 and bent sipes 8. Each of the inclined sipes 7 is inclined in a first direction with respect to a tyre axial direction, for example. It is preferred that each of the bent sipes 8 includes first inclined elements 8A inclined in the first direction with respect to the tyre axial direction and a second inclined element 8B inclined in an opposite direction to the first direction.

The plurality of the sipes 6 in this embodiment includes the inclined sipes 7 and the bent sipes 8, therefore, the land region 5 is less liable to be twisted, thereby, it is possible that damage of the land region 5 is suppressed even when an excessive load is applied thereto. Therefore, the durability performance of the tyre 1 in this embodiment is improved. Further, it is possible that the bent sipes 8 disperse a load applied to the land region 5 tyre axial direction by the first inclined elements 8A and the second inclined element 8B, therefore, the rigidity of the land region 5 is increased, thereby, it is possible that the steering stability performance on a dry road surface of the tyre 1 is improved.

Figure 3:
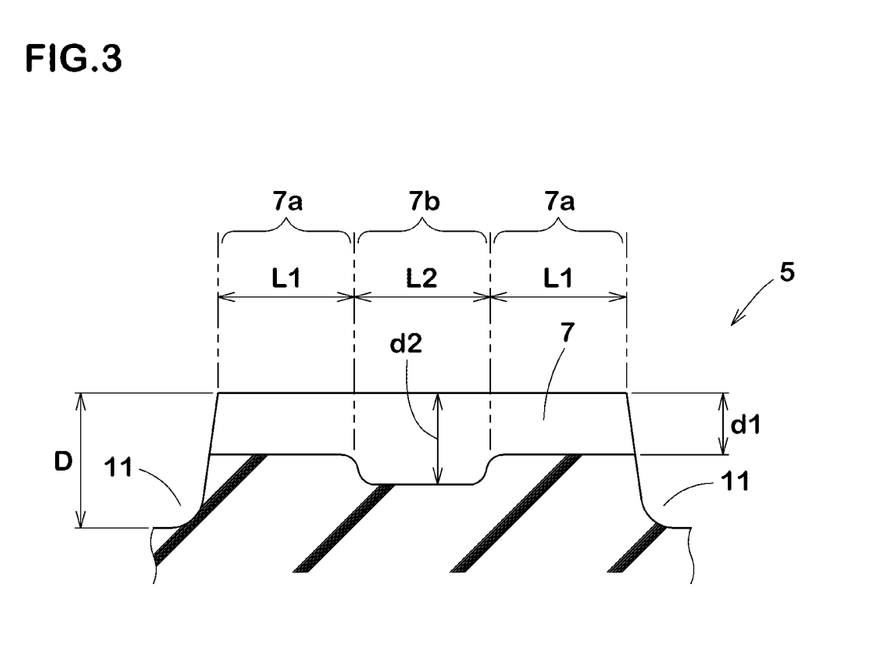
FIG. 3 is a cross-sectional view taken along A-A line of FIG. 2.

FIG. 3 is a cross-sectional view taken along A-A line of FIG. 2. As shown in FIG. 3, each of the inclined sipes 7 in this embodiment is configured to have a larger depth at a center portion (7b) thereof than at both end portions (7a) thereof. The depth of each of the inclined sipes 7 configured as such is not constant, therefore, decrease in the rigidity of the land region 5 is suppressed, thereby, it is possible that the steering stability performance on a dry road surface of the tyre 1 is improved.

Figure 4:
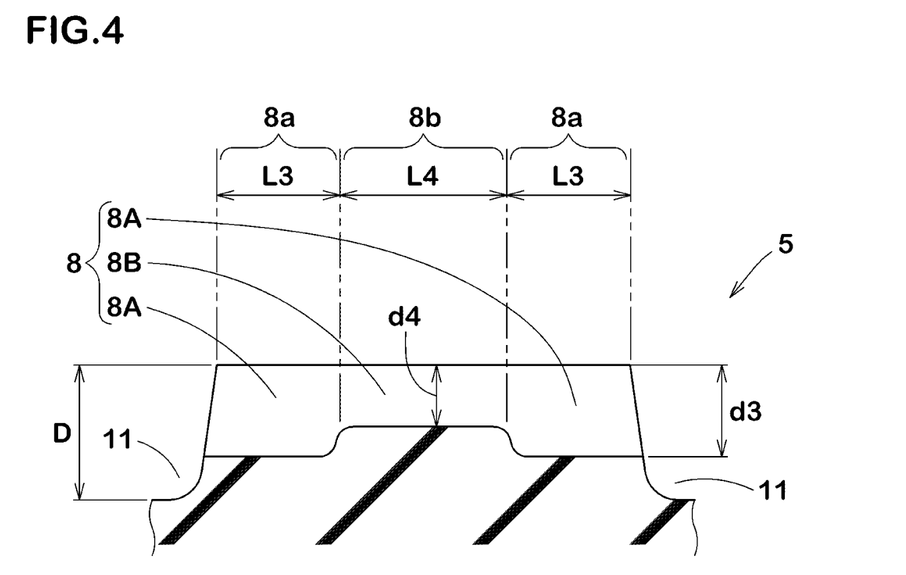
FIG. 4 is a cross-sectional view taken along B-B line of FIG. 2.

FIG. 4 is a cross-sectional view taken along B-B line of FIG. 2. As shown in FIG. 4, each of the bent sipes 8 in this embodiment is configured to have a smaller depth at a center portion (8b) thereof than at both end portions (8a) thereof. The depth of each of the bent sipes 8 configured as such is not constant, therefore, decrease in the rigidity of the land region 5 is suppressed, thereby, it is possible that the steering stability performance on a dry road surface of the tyre 1 is improved.

As shown in FIGS. 2 to 4, in the land region 5 provided with the inclined sipes 7 and the bent sipes 8 configured as such, a change in the depth of the inclined sipes 7 is different from a change in the depth of the bent sipes 8, therefore, the land region 5 is less liable to be twisted, thereby, it is possible that damage of the land region 5 is suppressed even when an excessive load is applied thereto. Therefore, in the tyre 1 in this embodiment, the durability performance is improved while both of the steering stability performance on a dry road surface and the on-ice/on-snow performance are exerted.

As shown in FIG. 2, it is preferred that the inclined sipes 7 and the bent sipes 8 are arranged alternately in the tyre circumferential direction. In the land region 5 provided with the inclined sipes 7 and the bent sipes 8 configured as such, distribution of the rigidity thereof is made uniform, therefore, it is possible that the durability performance of the tyre 1 is further improved.

It is preferred that each of the inclined sipes 7 extends linearly. It is preferred that each of the inclined sipes 7 is inclined at an angle θ1 in a range of from 25 to 30 degrees with respect to the tyre axial direction. The inclined sipes 7 configured as such exert larger edge effect in the tyre circumferential direction during running on an icy/snowy road surface, therefore, it is possible that the on-ice/on-snow performance of the tyre 1 is improved.

In this specification, dimensions and the like of various parts of the tyre 1 are those measured under a standard state unless noted otherwise. Further, lengths of various parts of the tyre 1 are those measured on an outer surface positioned outermost in a tyre radial direction of the tread portion 2. Here, in a case of a pneumatic tyre, the "standard state" is a state in which the tyre 1 is mounted on a standard rim, inflated to a standard inner pressure, and loaded with no tyre load.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

It is preferred that each of the bent sipes 8 is composed of the first inclined elements 8A and the second inclined element 8B configured to be linear. It is preferred that each of the first inclined elements 8A is inclined at an angle θ2 in a range of from 25 to 30 degrees with respect to the tyre axial direction. Further, it is preferred that the second inclined element 8B is inclined at an angle θ3 in a range of from 30 to 35 degrees with respect to the tyre axial direction. It is possible that the bent sipes 8 configured as such exert the edge effects in the tyre circumferential direction and the tyre axial direction in a good balance during running on an icy/snowy road surface, therefore, it is possible that the on-ice/on-snow performance of the tyre 1 is improved.

It is preferred that the inclined sipes 7 and the first inclined elements 8A extend in parallel to each other. It is possible that the inclined sipes 7 and the first inclined elements 8A configured as such exert larger edge effect in the tyre circumferential direction during running on an icy/snowy road surface.

As shown in FIG. 2 and FIG. 3, it is preferred that both end portions (7a) has an equal length L1 in the tyre axial direction. Further, it is preferred that a length L2 in the tyre axial direction of the center portion (7b) is equal to the length L1 in the tyre axial direction of each of the end portions (7a). The inclined sipes 7 configured as such have a uniform change in the depth, therefore, the rigidity of the land region 5 is distributed in a good balance, thereby, it is possible that the durability performance of the tyre 1 is improved.

As shown in FIG. 2 and FIG. 4, in each of the bent sipes 8 in this embodiment, the end portions (8a) are composed of the first inclined elements 8A and the center portion (8b) is composed of the second inclined element 8B. It is preferred that each of the first inclined elements 8A forming the end portions (8a) has an equal length L3 in the tyre axial direction. Further, it is preferred that a length L4 in the tyre axial direction of the second inclined element 8B is larger than the length L3 in the tyre axial direction of each of the first inclined elements 8A. In the bent sipes 8 configured as such, the length L4 in the tyre axial direction having a different inclination direction is large, therefore, the rigidity of the land region 5 is distributed in a good balance as a whole, thereby, it is possible that the durability performance of the tyre 1 is improved.

As shown in FIGS. 2 to 4, it is preferred that the length L4 in the tyre axial direction of the second inclined element 8B is in a range of from 110% to 135% of the length L2 in the tyre axial direction of the center portion (7b) of each of the inclined sipes 7. It is possible that the inclined sipes 7 and the bent sipes 8 configured as such make the rigidity of the land region 5 proper in a good balance as a whole, therefore, it is possible that the steering stability performance on a dry road surface of the tyre 1 is improved.

As shown in FIG. 2, the land region 5 in this embodiment is provided with first lateral grooves 9 each extending from the first edge 3 to terminate within the land region 5 and second lateral grooves 10 each extending from the second edge 4 to terminate within the land region 5. It is preferred that the first lateral grooves 9 and the second lateral grooves 10 are arranged alternately in the tyre circumferential direction. The land region 5 configured as such is not provided with a lateral groove crossing the land region 5, therefore, the rigidity thereof is maintained, thereby, it is possible that the steering stability performance on a dry road surface of the tyre 1 is improved. Further, the first lateral grooves 9 and the second lateral grooves 10 form snow blocks therein and shear them, therefore, the on-ice/on-snow performance of the tyre 1 is improved.

A length L6 in the tyre axial direction of each of the second lateral grooves 10 in this embodiment is equal to a length L5 in the tyre axial direction of each of the first lateral grooves 9. It is preferred that the length L5 in the tyre axial direction of each of the first lateral grooves 9 and the length L6 in the tyre axial direction of each of the second lateral grooves 10 are each smaller than the length L1 in the tyre axial direction of the end portions (7a) of each of the inclined sipes 7. Further, it is preferred that the length L5 in the tyre axial direction of each of the first lateral grooves 9 and the length L6 in the tyre axial direction of each of the second lateral grooves 10 are each larger than the length L3 in the tyre axial direction of the end portions (8a) of each of the bent sipes 8. The first lateral grooves 9 and the second lateral grooves 10 extend in parallel to each other, for example. It is possible that the first lateral grooves 9 and the second lateral grooves 10 configured as such improve the on-ice/on-snow performance of the tyre 1 in a good balance with respect to the tyre axial direction.

It is preferred that an angle θ4 of each of the first lateral grooves 9 with respect to the tyre axial direction is in a range of from 25 to 30 degrees. Further, it is preferred that an angle 85 of each of the second lateral grooves 10 with respect to the tyre axial direction is in a range of from 25 to 30 degrees. It is preferred that each of the first lateral grooves 9 and the second lateral grooves 10 extends in parallel with the inclined sipes 7. It is possible that the first lateral grooves 9 and the second lateral grooves 10 configured as such, together with the inclined sipes 7, improve the on-ice/on-snow performance of the tyre 1.

It is preferred that, in each combination of one first lateral groove 9, one second lateral groove 10, and one bent sipe 8 adjacent to each other, at least one of the first lateral groove 9 and the second lateral groove 10 is arranged on an extended line of a corresponding one of the first inclined elements 8A of the bent sipe 8. Each of the first lateral groove 9 and the second lateral groove 10 in this embodiment is arranged on the extended line of a respective one of the first inclined elements 8A. It is possible that the first lateral grooves 9 and the second lateral grooves 10 configured as such, together with the first inclined elements 8A, further improve the on-ice/on-snow performance of the tyre 1.

As shown in FIG. 1, the tread portion 2 in this embodiment has crown vertical grooves 11 extending in the tyre circumferential direction adjacently to a tyre equator (c) on both sides thereof and shoulder vertical grooves 12 each extending in the tyre circumferential direction between a respective one of the crown vertical grooves 11 and its adjacent one of tread edges (Te).

Here, in a case of a pneumatic tyre, the tread edges (Te) are defined as outermost ground contacting positions in the tyre axial direction of the tyre 1 when the tyre 1 in the standard state is in contact with a flat surface with zero camber angle by being loaded with a standard tyre load. The center position in the tyre axial direction between the tread edges (Te) is the tyre equator (C).

The "standard tyre load" is a tyre load specified for the concerned tyre by a standard included in a standardization system on which the tyre is based, for example, the "maximum load capacity" in 3ATMA, maximum value listed in "TIRE LOAD LIMITS AT VARIOUS COLD INFLATION PRESSURES" table in TRA, and "LOAD CAPACITY" in ETRTO.

Each of the crown vertical grooves 11 and the shoulder vertical grooves 12 has a groove width of 2% or more of a tread width Tw, for example. Here, the tread width Tw is a distance in the tyre axial direction between the tread edges (Te) in the standard state.

The tread portion 2 in this embodiment has a plurality of land regions divided by the crown vertical grooves 11 and the shoulder vertical grooves 12. It is preferred that the plurality of the land region includes the crown land region 13 defined between the crown vertical grooves 11, middle land regions 14 each defined between a respective one of the crown vertical grooves 11 and its adjacent one of the shoulder vertical grooves 12, and shoulder land regions 15 each defined between a respective one of the shoulder vertical grooves 12 and its adjacent one of the tread edges (Te).

As shown in FIG. 1 and FIG. 2, the land region 5 defined between the first edge 3 and the second edge 4 in this embodiment is the crown land region 13 arranged on the tyre equator (C). Thereby, the crown land region 13 in this embodiment is provided with the inclined sipes 7, the bent sipes 8, the first lateral grooves 9, and the second lateral grooves 10 described above.

As shown in FIG. 3, it is preferred that a depth (d1) of each of the end portions (7a) of the inclined sipes 7 is in a range of from 40% to 50% of a depth (D) of each of the crown vertical grooves 11. Further, it is preferred that a depth (d2) of the center portion (7b) of each of the inclined sipes 7 is in a range of from 65% to 70% of the depth (D) of each of the crown vertical grooves 11. It is preferred that depth (d2) of the center portion (7b) of each of the inclined sipes 7 is larger than the depth (d1) of each of the end portions (7a) by 1 mm or more. The inclined sipes 7 configured as such make the rigidity of the crown land region 13 proper, therefore, it is possible that the steering stability performance of the tyre 1 on a dry road surface is improved.

As shown in FIG. 4, it is preferred that a depth (d3) of each of the end portions (8a) of the bent sipes 8 is in a range of from 65% to 70% of the depth (D) of each of the crown vertical grooves 11. Further, it is preferred that a depth (d4) of the center portion (8b) of each of the bent sipes 8 is in a range of from 40% to 50% of the depth (D) of each of the crown vertical grooves 11. It is preferred that depth (d4) of the center portion (8b) of each of the bent sipes 8 is smaller than the depth (d3) of each of the end portions (8a) by 1 mm or more. The bent sipes 8 configured as such make the rigidity of the crown land region 13 proper, therefore, it is possible that the steering stability performance of the tyre 1 on a dry road surface is improved.

Figure 5:
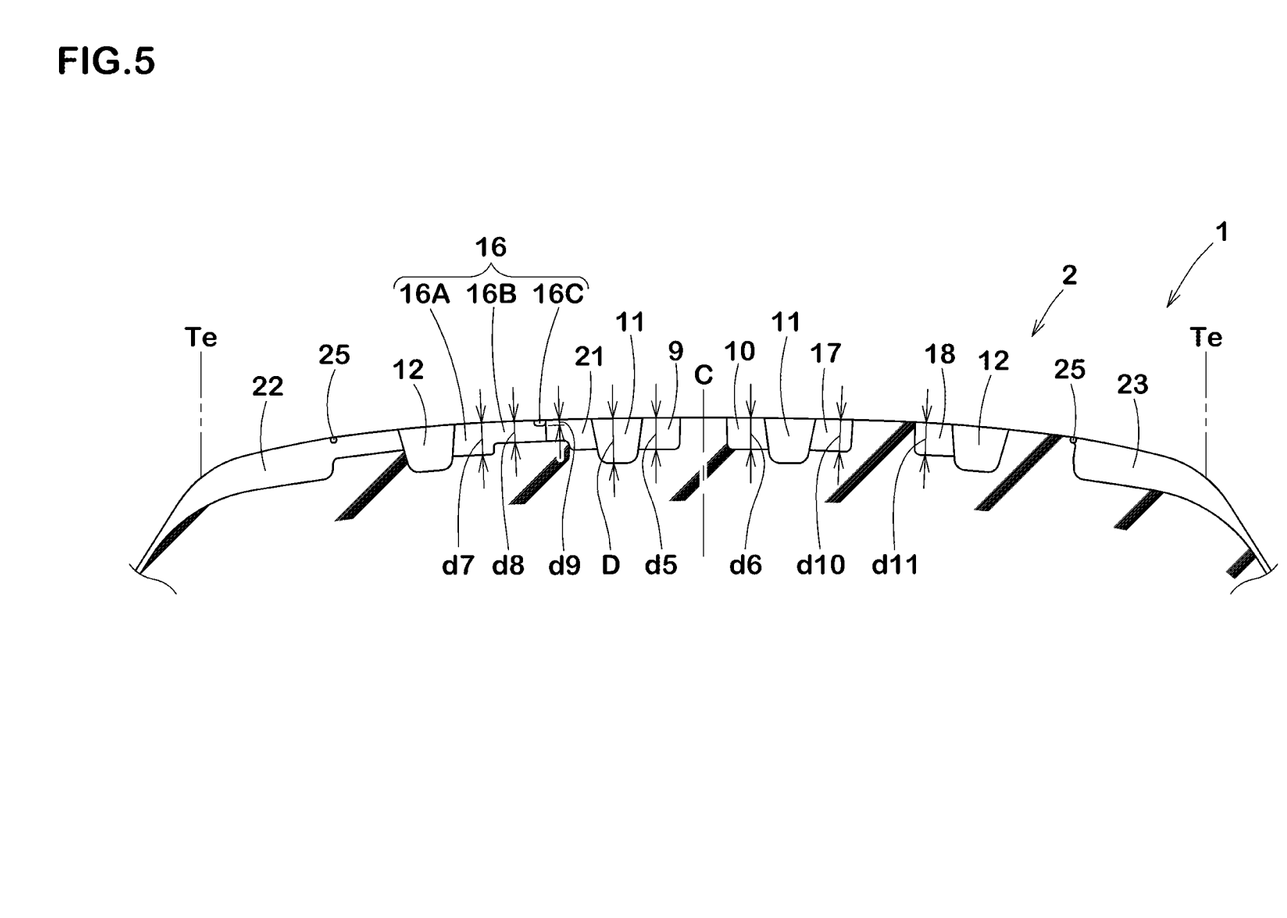
FIG. 5 is a cross-sectional view taken along c-c line of FIG. 1.

FIG. 5 is a cross-sectional view taken along C-C line of FIG. 1. As shown in FIG. 5, it is preferred that a depth (d5) of each of the first lateral grooves 9 is in a range of from 70% to 75% of the depth (D) of each of the crown vertical grooves 11. It is preferred that a depth (d6) of each of the second lateral grooves 10 is in a range of from 70% to 75% of the depth (D) of each of the crown vertical grooves 11. It is preferred that the depth (d5) of each of the first lateral grooves 9 and the depth (d6) of each of the second lateral grooves 10 are equal to each other. It is possible that the first lateral grooves 9 and the second lateral grooves 10 configured as such improve the on-ice/on-snow performance of the tyre 1 in a good balance with respect to the tyre axial direction.

Figure 6:
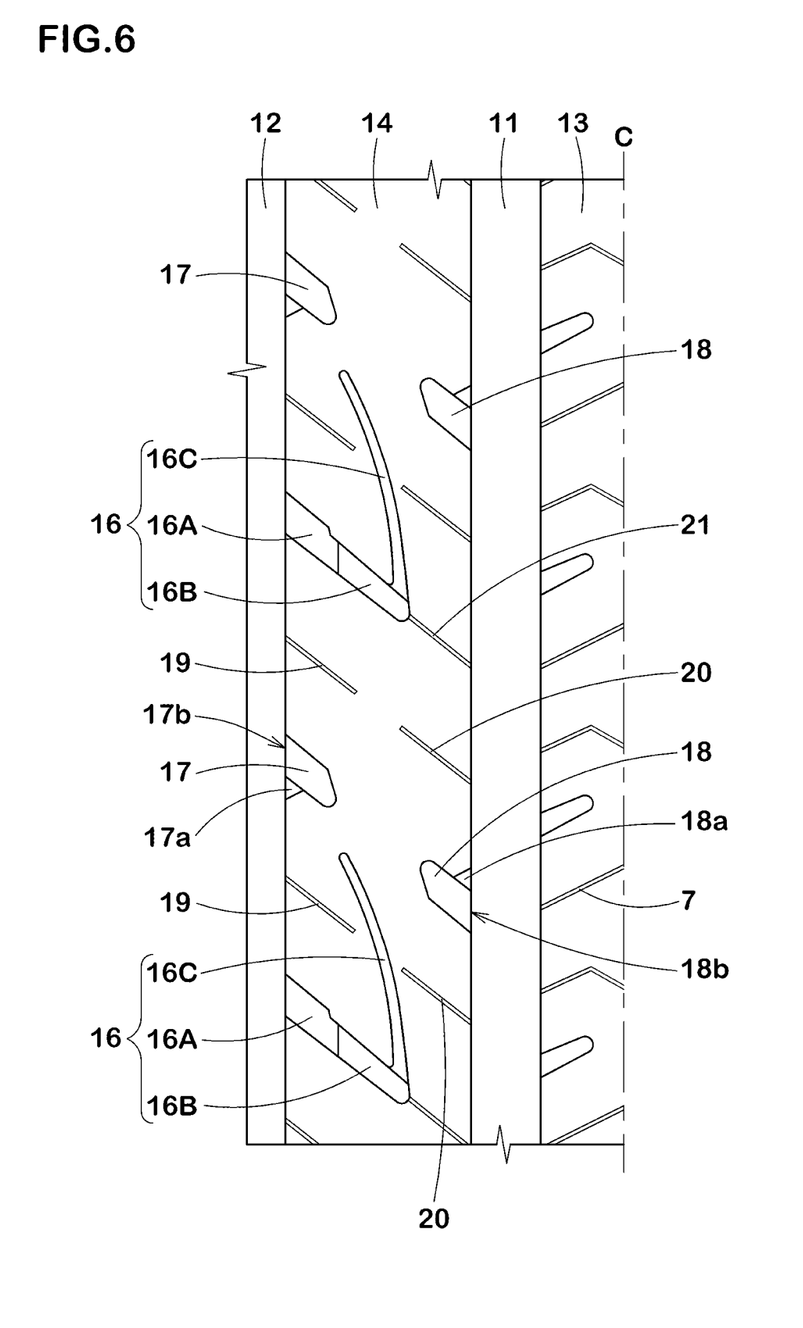
FIG. 6 is an enlarged view of a middle land region.

FIG. 6 is an enlarged view of one of the middle land regions 14. As shown in FIG. 6, each of the middle land regions 14 in this embodiment is provided with first middle lateral grooves 16 and second middle lateral grooves 17 extending from a respective one of the shoulder vertical grooves 12 and third middle lateral grooves 18 extending from a respective one of the crown vertical grooves 11.

Each of the first middle lateral grooves 16 includes a first middle element 16A, a second middle element 16B, and a third middle element 16c, for example. The first middle element 16A extends in the tyre axial direction from a respective one of the shoulder vertical grooves 12, the second middle element 16B is connected with the first middle element 16A and extends therefrom, and the third middle element 16c extends in the tyre circumferential direction from the second middle element 16B, for example. The first middle lateral grooves 16 configured as such can exert snow shearing force in the tyre circumferential direction and the tyre axial direction, therefore, it is possible that the on-ice/on-snow performance of the tyre 1 is improved.

It is preferred that the first middle element 16A and the second middle element 16B extend continuously in the tyre axial direction. The third middle element 16c in this embodiment extends in a curved manner with respect to the tyre circumferential direction. The first middle lateral grooves 16 configured as such do not cross the middle land regions 14, therefore, the decrease in the rigidity of the middle land regions 14 is suppressed, thereby, it is possible that the high steering stability performance of the tyre 1 on a dry road surface is maintained.

As shown in FIG. 5, it is preferred that a depth (d7) of each of the first middle elements 16A is in a range of from 70% to 75% of the depth (D) of each of the crown vertical grooves 11. Each of the second middle elements 16B in this embodiment has a depth (d8) smaller than the depth (d7) of each of the first middle elements 16A. It is preferred that each of the third middle elements 16C has a depth (d9) smaller than the depth (d8) of each of the second middle elements 16B. By the first middle lateral grooves 16 configured as such, the middle land regions 14 are less liable to be twisted, thereby, damage of the middle land regions 14 is suppressed even when an excessive load is applied thereto, therefore, it is possible that the durability performance of the tyre 1 is improved.

As shown in FIG. 6, it is preferred that each of the second middle lateral grooves 17 extends from the shoulder vertical grooves 12 to terminate within a respective one of the middle land regions 14. It is preferred that each of the third middle lateral grooves 18 extends from a respective one of the crown vertical grooves 11 to terminate within a respective one of the middle land regions. The second middle lateral grooves 17 and the third middle lateral grooves 18 configured as such form snow blocks therein and shear them, therefore, the on-ice/on-snow performance of the tyre 1 is improved.

It is preferred that each of the second middle lateral grooves 17 has a chamfered portion (17a) at an opening portion (17b) thereof with a respective one of the shoulder vertical grooves 12, for example. It is possible that the second middle lateral grooves 17 configured as such, together with the shoulder vertical grooves 12, improve the on-ice/on-snow performance of the tyre 1.

It is preferred that each of the third middle lateral grooves 18 has a chamfered portion (18a) at an opening portion (18b) thereof with a respective one of the crown vertical grooves 11, for example. It is preferred that the opening portion (18b) of each of the third middle lateral grooves 18 faces a respective one of the inclined sipes 7 of the crown land region 13 with a respective one of the crown vertical grooves 11 therebetween. It is possible that the third middle lateral grooves 18 configured as such, together with the crown vertical grooves 11 and the inclined sipes 7, improve the on-ice/on-snow performance tyre 1.

Each of the second middle lateral grooves 17 is arranged on an extended line of the third middle element 16c of a respective one of the first middle lateral grooves 16, for example. Each of the third middle lateral grooves 18 in this embodiment is arranged on an extended line of a respective one of the second middle lateral grooves 17. Thereby, the first middle lateral grooves 16, the second middle lateral grooves 17, and the third middle lateral grooves 18 cooperate with each other to improve the on-ice/on-snow performance of the tyre 1.

As shown in FIG. 5, it is preferred that each of the second middle lateral grooves 17 has a depth (d10) in a range of from 70% to 75% of the depth (D) of each of the crown vertical grooves 11. It is preferred that each of the third middle lateral grooves 18 has a depth (d11) in a range of from 70% to 75% of the depth (D) of each of the crown vertical grooves 11. It is preferred that the depth (d10) of each of the second middle lateral grooves 17 and the depth (d11) of each of the third middle lateral grooves 18 are equal to each other. It is possible that the second middle lateral grooves 17 and the third middle lateral grooves 18 configured as such improve the on-ice/on-snow performance of the tyre 1 in a good balance with respect to the tyre axial direction.

As shown in FIG. 6, each of the middle land regions 14 in this embodiment is provided with first middle sipes 19 and second middle sipes 20. Each of the first middle sipes 19 extends from a respective one of the shoulder vertical grooves 12 to terminate within a respective one of the middle land regions 14. Each of the second middle sipes 20 extends from a respective one of the crown vertical grooves 11 to terminate within a respective one of the middle land regions 14. It is preferred that each of the second middle sipes 20 is arranged on an extended line of a respective one of the first middle sipes 19. It is possible that the first middle sipes 19 and the second middle sipes 20 configured as such cooperate with each other to exert a large edge effect, therefore, both of the steering stability performance on a dry road surface and the on-ice/on-snow performance of the tyre 1 are exerted without decreasing the rigidity of the middle land regions 14.

In each combination of one third middle element 16c, one first middle sipe 19 and one second middle sipe 20 adjacent to each other, the third middle element 16c is arranged between the first middle sipe 19 and the second middle sipe 20 in this embodiment. The first middle lateral grooves 16, the first middle sipes 19, and the second middle sipes 20 configured as such cooperate with each other to improve the on-ice/on-snow performance of the tyre 1 while maintaining the rigidity of the middle land regions 14 high.

It is preferred that each of the middle land regions 14 is provided with third middle sipes each connecting between a respective one of the first middle lateral grooves 16 and its adjacent one of the crown vertical grooves 11. Each of the third middle sipes connects between the second middle element 16B of a respective one of the first middle lateral grooves 16 and its adjacent one of the crown vertical grooves 11, for example. It is possible that the third middle sipes configured as such improve the on-ice/on-snow performance of the tyre 1 by the edge effect thereof, while maintaining the high rigidity of the middle land regions 14.

As shown in FIG. 1, the shoulder land regions 15 in this embodiment is provided with first shoulder lateral grooves 22, second shoulder lateral grooves 23, and shoulder sipes 24. Each of the first shoulder lateral grooves 22, the second shoulder lateral grooves 23, and the shoulder sipes 24 extends from a respective one of the tread edges (Te) in the tyre axial direction. It is preferred that each of the shoulder land regions 15 is provided with a narrow groove 25 extending continuously in the tyre circumferential direction.

In each of the shoulder land regions 15, each of the first shoulder lateral grooves 22 in this embodiment extends from the tread edge (Te) and beyond the narrow groove 25 to the shoulder vertical groove 12. It is preferred that each of the first shoulder lateral grooves 22 has a chamfered portion (22a) at an opening portion (22b) thereof with its adjacent one of the shoulder vertical grooves 12. The first shoulder lateral grooves 22 configured as such form snow blocks therein and shear them, therefore, the on-ice/on-snow performance of the tyre 1 is improved. Further, it is possible that the first shoulder lateral grooves 22 cooperate with the shoulder vertical grooves 12 to improve the on-ice/on-snow performance of the tyre 1.

Each of the second shoulder lateral grooves 23 in this embodiment extends from a respective one of the tread edges (Te) to a respective one of the narrow grooves 25. The second shoulder lateral grooves 23 configured as such form snow blocks therein and shear them, therefore, the on-ice/on-snow performance of the tyre 1 is improved. Further, the second shoulder lateral grooves 23 do not cross the shoulder land regions 15, therefore, the rigidity of the shoulder land regions 15 is increased, thereby, it is possible that the steering stability performance of the tyre 1 on a dry road surface is improved.

It is preferred that the first shoulder lateral grooves 22 and the second shoulder lateral grooves 23 are arranged alternately in the tyre circumferential direction. The shoulder land regions 15 provided with the first shoulder lateral grooves 22 and the second shoulder lateral grooves 23 configured as such disperses the rigidity thereof in a good balance, therefore, It is possible that the durability performance of the tyre 1 is improved.

Each of the shoulder sipes 24 in this embodiment extends from a respective one of the tread edges (Te) to its adjacent one of the narrow grooves 25. At least one shoulder sipe 24, two shoulder sipes 24 in this embodiment, is arranged between each pair of the first shoulder lateral groove 22 and the second shoulder lateral groove 23 adjacent to each other in the tyre circumferential direction. It is possible that the shoulder sipes 24 configured as such improve the on-ice/on-snow performance of the tyre 1 by the edge effect thereof while maintaining the rigidity of the shoulder land regions 15 high.

A groove width of each of the narrow grooves 25 is smaller than 2% of the tread width Tw, for example. It is possible that the narrow grooves 25 configured as such exert large edge effect in the tyre axial direction and improve the on-ice/on-snow performance of the tyre 1 while maintaining the rigidity of the shoulder land regions 15 high.

While detailed description has been made of the tyres as especially preferred embodiments of the present invention, the present invention can be embodied in various forms without being limited to the illustrated embodiments.

WORKING EXAMPLES (EXAMPLES)

Tyres having the basic pattern shown in FIG. 1 were made by way of test according to the specifications listed in Table 1. Each of the test tyres was tested for the steering stability performance, the on-ice/on-snow performance, and the durability performance.
common specifications of each of the test tyres and the test methods were as follows.
Tyre size: 215/60R16
Tyre rim: 16×6.5)
<Steering Stability Performance>
Each of the test tyres was mounted on all wheels of a test vehicle of front wheel drive mid-size passenger car and then inflated to a tyre inner pressure of 240 kPa. While a test driver drove the test vehicle on a dry road surface, the steering stability performance was evaluated by the driver's feeling. The test results are indicated by an index based on Reference 1 being 100, wherein the larger the numerical value, the better the steering stability performance is.
<On-Ice/On-Snow Performance>
Each of the test tyres was mounted on all wheels of the test vehicle of front wheel drive mid-size passenger car and then inflated to the tyre inner pressure of 240 kPa. While the test driver drove the test vehicle on an icy/snowy road surface, the steering stability performance was evaluated by the driver's feeling. The test results are indicated by an index based on the Reference 1 being 100, wherein the larger the numerical value, the better the on-ice/on-snow performance is.
<Durability Performance>
Each of the test tyres was inflated to a tyre inner pressure of 220 kPa and mounted on a bench durability testing machine. Each of the test tyres was run at a speed equivalent to 120 km/h, and the durability performance was evaluated while the tyre load applied to the test tyre was changed stepwise. The test results are indicated by an index based on the Reference 1 being 100, wherein the larger the numerical value, the better the durability performance is.
The test results are shown in Table 1.

TABLE 1

|  | Ref. 1 | Ref. 2 | Ref. 3 | Ref. 4 | Ex. 1 | Ex. 2 | Ex. 3 |
|---|---|---|---|---|---|---|---|
| Magnitude relation between Depth (d1) at both End portions and Depth (d2) at Center portion of Inclined sipe | d1 = d2 | d1 < d2 | d1 < d2 | d1 < d2 | d1 < d2 | d1 < d2 | d1 < d2 |
| Magnitude relation between Depth (d3) at both End portions and Depth (d4) at Center portion of Bent sipe | d3 > d4 | d3 = d4 | d3 < d4 | d3 > d4 | d3 > d4 | d3 > d4 | d3 > d4 |
| Inclination direction of First inclined element and Second inclined element | opposite | opposite | opposite | same | opposite | opposite | opposite |
| Magnitude relation between Length L1 at both End portions and Length L2 at Center portion of Inclined sipe | L1 = L2 | L1 = L2 | L1 = L2 | L1 = L2 | L1 = L2 | L1 < L2 | L1 = L2 |
| Magnitude relation between Length L3 at both End portions and Length L4 at Center portion of Bent sipe | L3 < L4 | L3 < L4 | L3 < L4 | L3 < L4 | L3 < L4 | L3 < L4 | L3 = L4 |
| Steering stability performance [index] | 100 | 100 | 85 | 100 | 105 | 100 | 100 |
| On-ice/on-snow performance [index] | 100 | 95 | 95 | 75 | 110 | 100 | 105 |
| Durability performance [index] | 100 | 95 | 105 | 100 | 120 | 110 | 105 |

From the test results, it was confirmed that the durability performance is improved while both the steering stability performance on a dry road surface and the on-ice/on-snow performance are exerted in a good balance for the tyres as the Examples as compared with the tyres as the References.

The invention claimed is:

1. A tyre comprising a tread portion comprising a land region divided by
    a first edge extending in a tyre circumferential direction and
    a second edge extending in the tyre circumferential direction, wherein
    the land region is provided with a plurality of sipes each extending between the first edge and the second edge,
    the plurality of the sipes includes inclined sipes and bent sipes,
    each of the inclined sipes extends from the first edge to the second edge, while inclining in a first direction with respect to a tyre axial direction,
    each of the bent sipes extends from the first edge to the second edge, and consists of a pair of first inclined elements and a second inclined element connecting therebetween,
    the first inclined elements are inclined in the first direction with respect to the tyre axial direction whereas the second inclined element is inclined in a direction opposite to the first inclined elements with respect to the tyre axial direction,
    each of the inclined sipes is configured to have a depth larger at a center portion thereof than at both end portions thereof,
    each of the bent sipes is configured to have a depth smaller at a center portion thereof than at both end portions thereof,
    the land region is provided with first lateral grooves and second lateral grooves,
    each of the first lateral grooves extends from the first edge toward the second edge and terminates within the land region,
    each of the second lateral grooves extends from the second edge toward the first edge and terminates within the land region, and
    the first lateral grooves and the second lateral grooves are arranged alternately in the tyre circumferential direction, wherein
        each of the first lateral grooves extending from the first edge of the land region is arranged on an extended line of one of the first inclined elements extending from the second edge of the land region, and/or each of the second lateral grooves extending from the second edge of the land region is arranged on an extended line of one of the first inclined elements extending from the first edge of the land region,
    in each of the bent sipes, the end portions are formed by the first inclined elements and the center portion is formed by the second inclined element, and
    a length in the tyre axial direction of the second inclined element is in a range of from 110% to 135% of a length in the tyre axial direction of the center portion of each of the inclined sipes.

2. The tyre according to claim 1, wherein
the inclined sipes and the bent sipes are arranged alternately in the tyre circumferential direction.

3. The tyre according to claim 1, wherein
each of the inclined sipes extends linearly.

4. The tyre according to claim 1, wherein
the first inclined elements forming the end portions have an equal length to each other in the tyre axial direction.

5. The tyre according to claim 1, wherein
a length in the tyre axial direction of the second inclined element is larger than a length in the tyre axial direction of each of the first inclined elements.

6. The tyre according to claim 1, wherein
the inclined sipes and the first inclined elements extend in parallel to each other.

7. The tyre according to claim 1, wherein
a length in the tyre axial direction of each of the second lateral grooves is equal to a length in the tyre axial direction of each of the first lateral grooves.

8. The tyre according to claim 1, wherein
the land region is arranged on a tyre equator.

9. The tyre according to claim 1, wherein
each of the first inclined elements is inclined at an angle in a range of from 25 to 30 degrees with respect to the tyre axial direction.

10. The tyre according to claim 9, wherein
the second inclined element is inclined at an angle in a range of from 30 to 35 degrees with respect to the tyre axial direction.

11. The tyre according to claim 1, wherein
the tread portion further comprises a shoulder land region defined between a tread edge and a shoulder vertical groove extending in the tyre circumferential direction adjacently to the tread edge, the shoulder land region is provided with first shoulder lateral grooves, second shoulder lateral grooves, and shoulder sipes, each of the first shoulder lateral grooves extends between the tread edge and the shoulder vertical groove, each of the second shoulder lateral grooves extends from the tread edge to terminate within the shoulder land region, and each of the shoulder sipes extends from the tread edge to terminate within the shoulder land region.

12. A tyre comprising a tread portion comprising a crown land region defined between a first edge extending in a tyre circumferential direction and a second edge extending in the tyre circumferential direction and a middle land region positioned between the first edge and a shoulder vertical groove extending in the tyre circumferential direction on a side opposite to the second edge of the first edge, wherein the crown land region is provided with a plurality of sipes each extending between the first edge and the second edge, the plurality of the sipes includes inclined sipes and bent sipes, the inclined sipes are inclined in a first direction with respect to a tyre axial direction, each of the bent sipes includes first inclined elements inclined in the first direction with respect to the tyre axial direction and a second inclined element inclined in a direction opposite to the first inclined elements with respect to the tyre axial direction, each of the inclined sipes is configured to have a depth larger at a center portion thereof than at both end portions thereof, each of the bent sipes is configured to have a depth smaller at a center portion thereof than at both end portions thereof, the middle land region is provided with a middle lateral groove including a first middle element, a second middle element, and a third middle element, the first middle element extends in the tyre axial direction from the shoulder vertical groove, the second middle element is connected with the first middle element and extends therefrom, the third middle element extends in the tyre circumferential direction from the second middle element, and a length in the tyre axial direction of the center portion of each of the inclined sipes is smaller than a length in the tyre axial direction of the center portion of each of the bent sipes.

13. The tyre according to claim 12, wherein
each of the bent sipes is composed of the first inclined elements and the second inclined element configured to be linear.

14. The tyre according to claim 12, wherein
the middle lateral groove consists of the first middle element, the second middle element, and the third middle element, the first middle element extends axially inwardly from the shoulder vertical groove, the second middle element extends axially inwardly from an axially inner end of the first middle element in the same direction as the first middle element with a groove width smaller than the first middle element, and the third middle element extends from an axially inner end of the second middle element toward the tyre circumferential direction in a curved shape, and terminates within the middle land region.

15. The tyre according to claim 12, wherein
the middle lateral groove is communicated with the first edge via an other sipe.

16. A tyre comprising a tread portion comprising a land region divided by a first edge extending in a tyre circumferential direction and a second edge extending in the tyre circumferential direction, wherein the land region is provided with a plurality of sipes each extending between the first edge and the second edge, the plurality of the sipes includes inclined sipes and bent sipes, the inclined sipes are inclined in a first direction with respect to a tyre axial direction, each of the bent sipes includes first inclined elements inclined in the first direction with respect to the tyre axial direction and a second inclined element inclined in a direction opposite to the first inclined elements with respect to the tyre axial direction, each of the inclined sipes is configured to have a depth larger at a center portion thereof than at both end portions thereof, each of the bent sipes is configured to have a depth smaller at a center portion thereof than at both end portions thereof, and a length in the tyre axial direction of the center portion of each of the inclined sipes is smaller than a length in the tyre axial direction of the center portion of each of the bent sipes.

17. The tyre according to claim 16, wherein
the land region is provided with first lateral grooves and second lateral grooves, each of the first lateral grooves extends from the first edge to terminate within the land region, each of the second lateral grooves extends from the second edge to terminate within the land region, and the first lateral grooves and the second lateral grooves are arranged alternately in the tyre circumferential direction.

18. The tyre according to claim 17, wherein
in a combination of one first lateral groove, one second lateral groove, and one bent sipe adjacent to each other, at least one of the first lateral groove and the second lateral groove is arranged on an extended line of a corresponding one of the first inclined elements of the bent sipe.

* * * * *